UNITED STATES PATENT OFFICE 2,405,058

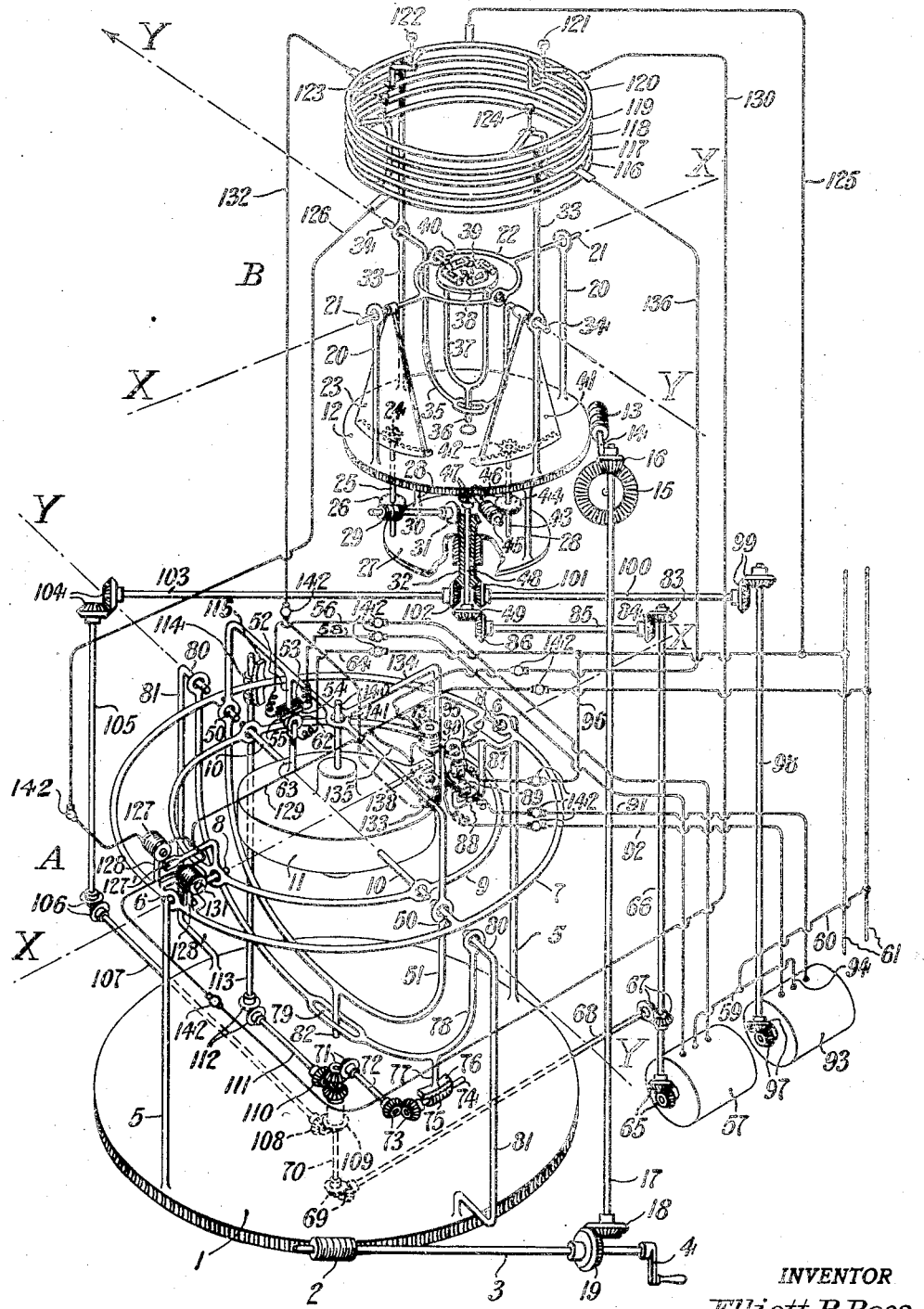

GYROSCOPIC APPARATUS

Elliott P. Ross, Forest Hills, N. Y., assignor to Ford Instrument Company, Inc., Long Island City, N. Y., a corporation of New York Application March 31, 1932, Serial No. 602,372
Renewed November 4, 1938

11 Claims. (Cl. 33—204)

This invention relates to gyroscopic apparatus of the type in which a gyroscope is employed for stabilizing or controlling other devices, as for instance, the elements of a fire control system, for maintaining them in a predetermined position of that they may serve as a datum for use in the operation of the system.

It is well known that gyroscopes for this purpose are subject to straying, due to various causes, thereby producing variations in the predetermined position of the stabilized elements with resultant errors in the system of which they form a part. In attempts to compensate for these errors arrangements have been proposed and used for detecting the straying of the gyroscope and applying corrective torques thereto to cause precession to restore the gyroscope to its normal datum establishing position.

In these prior arrangements, however, the devices for detecting straying of the gyroscope and the mechanism for precessing the gyroscope are located entirely at the gyroscope, thus requiring the presence of one or more operators at the gyroscope for observing the device and manipulating the corrective torque applying mechanism. This means that the gyroscope must be located where it will be easily accessible to the operators whose duty it is to observe the straying and compensate for it. This imposes limitations upon the most convenient arrangement, for in some cases a more satisfactory design can be obtained by placing the gyroscopic unit in a less accessible place.

It is accordingly an object of this invention to provide a gyroscopic apparatus in which the devices for indicating the straying of the gyroscope and the apparatus for controlling the corrective torque applying mechanism are located at a point freely accessible to the operator, while the gyroscope together with the corrective torque applying mechanism, which must necessarily be placed at the gyroscope, are located at a point best suited to convenient arrangement and efficient design. The gyroscope and corrective torque applying mechanism are operatively connected to the device for indicating the straying of the gyroscope and the apparatus for controlling the corrective torque applying mechanism by suitable electrical and/or mechanical connections so that the devices for indicating the straying of the gyroscope are always maintained in proper relation to the gyroscope to show the axis or axes of the gyroscope about which straying takes place in order that the corrective or compensating torque may be applied about the proper axis or axes.

The particular nature of the invention, as well as other objects and advantages thereof, will be apparent from a consideration of the description of a preferred embodiment shown in a diagrammatic manner in the single figure of the drawing.

The main gimbal system A, which supports the gyroscope, is suitably mounted on a rotatable base or turntable 1 carried for rotation in the usual manner on a pedestal (not shown). The pedestal may be located at any point in the system of which the apparatus forms a part, best suited to a convenient and efficient design. The periphery of turntable 1 is toothed to mesh with a worm 2 carried by a shaft 3 which extends through the casing (not shown) of the instrument and terminates in a hand crank 4. On turntable 1 are fixed vertical standards 5 which terminate at their upper ends in trunnions 6 upon which is mounted by means of suitable bearings the outer ring 7 of the gimbal system. Outer ring 7 is provided with inwardly extending trunnions 8 aligned with trunnions 6 to define one axis of the gyroscopic system. This axis has for purpose of reference been designated as the X—X axis. On trunnions 8 is mounted by means of suitable bearings the inner ring 9 of the gimbal system. This ring is provided with suitable bearings located on a line at right angles to the X—X axis to support the trunnions 10 of the gyroscope 11. Trunnions 10 define the Y—Y axis of the gyroscopic system.

The auxiliary gimbal system, which carries the device for indicating the straying of the gyroscope 1 and the apparatus for controlling the corrective torque applying mechanism is designated as B, and is mounted on a base or turntable 12 carried for rotation on a suitable pedestal (not shown) located at such a point that the devices for indicating straying are in easy view and the apparatus for controlling the corrective torque applying mechanism is within easy reach of the operator whose duty it is to operate this apparatus. The periphery of turntable 12 is toothed to mesh with worm 13 mounted on shaft 14. Shaft 14 also carries a bevel gear 15 which meshes with a bevel gear 16 carried by a shaft 17. At the end of shaft 17 is a bevel gear 18 which meshes with a like gear 19 carried by shaft 3. By this arrangement turntables 1 and 12 are rotated together about their respective centers by the rotation of crank 4.

On turntable 12 are fixed standards 20 which terminate at their upper ends in suitable bearing for supporting trunnions 21 of a gimbal ring 22. Trunnions 21 define the X—X axis of the auxiliary gimbal system, which is maintained parallel to the X—X axis of the main gimbal system by the connections between the turntables 1 and 12. Fixed on one of the trunnions 21 is a gear sector 23 which meshes with a pinion 24 mounted on a shaft 25 which extends through turntable 12 and carries at its other end a worm gear 26. Shaft 25 is mounted for rotation in a plate 27 which is fastened to rotate with turntable 12 by means of members 28. A worm 29 meshes with worm gear 26 and is carried by a shaft 30 which also carries a bevel gear 31. Bevel gear 31 meshes with a double bevel gear 32 mounted for rotation at the center of plate 27. The purpose of gear sector 23 and the train of elements connecting it to double bevel gear 32 will be explained hereinafter.

Turntable 12 also carries standards 33 mounted on a line at right angles to the line upon which standards 20 are located. These standards carry suitable bearings at the level of the bearings on standards 20 for the support of trunnions 34 of a bail member 35. The middle portion of the bail member 35 is slotted to accommodate a pin 36 depending from a second bail member 37 connected at its ends to a disc 38 upon which four spirit levels 39 are mounted. Trunnions 40 support disc 38 in suitable bearings in gimbal ring 22, these trunnions being normally coaxial with trunnions 34 and defining the Y—Y axis of the auxiliary gimbal system which is maintained parallel to the corresponding axis of the main gimbal system by the connection between the turntables. Two of the spirit levels 39 are placed transversely to the diameter of disc 38 normally coincident with the X—X axis. The other two spirit levels 39 are placed transversely to the diameter of disc 38 normally coincident with the Y—Y axis so that by inspection one can tell about what axis or axes the disc 38 has moved out of normal position. An arrow is scribed on disc 38 to indicate the direction to which the gimbal systems A and B are trained. A gear sector 41 is fixed to one of the trunnions 34 and meshes with a pinion 42 carried by a shaft 43. Shaft 43 extends through turntable 12 and carries on the other side of it a worm gear 44 which meshes with a worm 45 mounted on shaft 46. Shaft 43 is mounted for rotation in plate 27. Shaft 46 carries at its end one of a pair of meshing bevel gears 47. The other gear is carried by a shaft 48 which extends through the center of double bevel gear 32 to rotate independently thereof and carries a bevel gear 49.

The mechanism for causing the circular plate 38 to follow accurately every movement of the gyroscope 11, relative to the deck of the ship, so that it will at all times be maintained parallel to the gyroscope and will indicate by means of the spirit levels 39 any straying of the gyroscope 11 from the normal position will now be described. Outer ring 7 of the main gimbal system A is provided with inwardly extending trunnions 50 normally aligned with trunnions 10 of gyroscope 11. Upon trunnions 50 is mounted by means of suitable bearings, a U-shaped gimbal member 51 which has the upper ends of the U continued inwardly to form a ring. Gimbal member 51, also called the vertical frame, is normally in a plane which contains the Y—Y axis. Depending from gimbal member 51 is a rod 52 which carries a commutator 53 normally on the X—X axis with its contact surfaces arranged substantially perpendicular thereto vertically. Commutator 53 is formed of a block of insulation material in which is embedded contact members 54 and 55 separated from each other by a central insulation strip. Due to its construction commutator 53 is electrically insulated from the gimbal member 51. A conductor 56 connects one of the contact members to one of the terminals of a reversible motor 57. A conductor 58 connects the other of the contact members to another of the terminals of the reversible motor. Conductors 59 and 60 connect the common terminal of motor 57 to one side of a supply 61. A contact roller 62 is carried by a horizontal rod 63 mounted on gyroscope 11 on the line of the X—X axis. The roller 62 is electrically insulated from rod 63 and gyroscope 11 and is connected by means of a conductor 64 to the other side of the supply 61.

Roller 62 normally contacts with the insulation strip which separates contact members 54 and 55 but if there is relative movement between the gimbal member 51 and the gyroscope 11, about the Y—Y axis, roller 62 will come into contact with contact member 54, assuming that the relative movement of the gyroscope is in a clockwise direction as viewed by an operator standing in front of the instrument proximate to the hand crank 4, and will close the electrical circuit of the reversible motor 57, from one side of the supply line 61, through conductor 64, roller 62, contact member 54, conductor 58 to the corresponding terminal of motor 57, and from the common terminal of the motor through conductors 59 and 60 to the other side of the supply line. Motor 57 will then rotate in the proper direction and will cause a like rotation of bevel gears 65, shaft 66, bevel gears 67, shaft 68, bevel gears 69, shaft 70, which is located for independent rotation through the center of turntable 1, bevel gears 71, shaft 72, bevel gears 73, shaft 74 and worm 75 carried thereby.

Worm 75 meshes with a worm gear sector 76 carried by a rod 77 depending from a gimbal member 78 which has a central slot 79. Gimbal member 78 is supported by means of suitable bearings on trunnions 80, normally aligned with the trunnions 19 of the gyroscope 11, formed at the upper ends of standards 81 fixed to the turntable 1. A rod 82, normally aligned with the vertical axis of the gyroscope 11, depends from gimbal member 51 and fits into the slot 79 so that as worm 75 rotates under the influence of the rotation of motor 57 and moves worm wheel sector 76, rod 77 and gimbal member 78 about trunnions 80, rod 82 will also move and carry gimbal member 51 with it. This will result in commutator 54 being moved in a clockwise direction to bring its central insulation strip again into contact with roller 62 thereby opening the circuit of motor 57 when gimbal member 51 again assumes its normal position with reference to the gyroscope 11.

If it is assumed that the gyroscope has moved relative to the gimbal member 51 in a counterclockwise direction about the Y—Y axis, as viewed by an operator standing in front of the instrument proximate to the hand crank 4, the roller 62 will at first come into contact with contact member 55 of the commutator 53 and the motor 57 will be energized through the circuit established from the supply 61 through conductors 60 and 59 to the common terminal of the motor, thence to another terminal and through conductor 56 to contact member 55, roller 62, conductor 64 to the other side of the supply. The action of the motor is very rapid and gimbal member 51 substantially instantaneously follows every increment of movement of the gyroscope.

The rotation of motor 57 in following the movements of the gyroscope is transmitted through bevel gears 65 and shaft 66 to bevel gear 83 which through bevel gear 84, shaft 85 and bevel gear 86 transmits the movement to bevel gear 49. Thus as motor 57 rotates its rotation will be transmitted through bevel gear 49, shaft 48, bevel gears 47, shaft 46, worm 45, worm wheel 44, shaft 43 to pinion 42 which in rotating will move gear sector 41 to move gimbal member 35 a corresponding amount. Movement of gimbal member 35 will be transmitted by pin 36 and bail member 37 to the circular disc 38 which will thus follow the movement of the gyroscope about the Y—Y axis.

If the movement of the gyroscope 11 relative to the deck of the ship has been due to the deck changing its position relative to the horizontal, the spirit levels will all be level, but if the movement has been due to straying of the gyroscope about the Y—Y axis, the two spirit levels parallel to the Y—Y axis will remain level, but those at right angles to the Y—Y axis will have their ends nearest the sector 23 lowered and the opposite ends raised, assuming as before that the relative movement of the gyroscope is counter-clockwise about the Y—Y axis.

In order to duplicate the relative motion of the gyroscope 11 about the X—X axis outer ring 7 is provided at one of its trunnions 8 with a depending member 87 which carries a commutator 88, similar to commutator 53 previously described, having contact members 89 and 90 which connect through conductors 91 and 92 respectively to terminals of the reversible motor 93. The common terminal is connected through conductors 94 and 60 to one side of the supply 61. A contact roller 95 is carried by inner ring 9 below the trunnion 8 just mentioned. Insulation is used to electrically insulate ring 9 from roller 95. A conductor 96 connects roller 95 through conductor 64 to one side of the supply 61. Assuming the gyroscope and ring 9 tilt relative to ring 7, in a clockwise direction, as viewed by an operator standing in front of the instrument proximate to the standard 5 furthest removed from motors 57 and 93, about the X—X axis, roller 95 will come into contact with contact element 90 and close the circuit of the reversible motor from one side of the supply through conductors 60 and 94 to the common terminal, from another terminal through conductor 92, contact member 90, roller 95, conductor 96, conductor 64 to the other side of the supply, to rotate motor 93. The rotation of motor 93 causes a like rotation of bevel gears 97, shaft 98, bevel gears 99, shaft 100 and bevel gear 101 which meshes with one of the gears of double bevel gear 32.

The rotation of double gear 32 will rotate bevel gear 102, shaft 103, gears 104, shaft 105, bevel gears 106, shaft 107, and bevel gear 108. Bevel gear 108 meshes with one bevel gear of the double bevel gear 109 which is mounted for rotation through the center of turntable 1. The other bevel gear of the double bevel gear 109 meshes with bevel gear 110, on shaft 111 to drive bevel gears 112 and shaft 113 upon which is mounted worm 114. Worm 114 drives a worm wheel sector 115 mounted on outer ring 7 near one of trunnions 50. As worm 114 rotates the outer ring will also rotate to follow the movement of inner ring 9 and carry the commutator to the open circuit position. The follow-up action is similar to that described in connection with motion of the gyroscope about the Y—Y axis and need not be repeated. In the event that the gyroscope moves relative to the ring 7 in a counterclockwise direction, as viewed by an operator standing in front of this instrument proximate to the standard 5 furthest removed from motors 57 and 93, roller 95 will come in contact with contact element 89 and the circuit will be closed from one side of the supply to the common terminal of motor 93 and from another terminal through conductor 91, contact element 89, roller 95, conductors 96 and 64 to the other side of the supply 61.

The rotation of double gear 32 will also cause the rotation of gear 31, shaft 30, worm 29, worm wheel 26, shaft 25 and pinion 24. Pinion 24 will move gear sector 23 as it rotates and cause gimbal ring 22 to rotate about the X—X axis causing a like rotation through trunnions 40 of circular plate 38. Assuming that the relative movement of gyroscope 11, in a clockwise direction about the X—X axis is due to straying, the spirit levels 39 parallel to the X—X axis will remain level but the levels at right angles to the X—X axis will have their ends nearest sector 41 lowered and opposite ends raised. If the relative movement of gyroscope 11 is counterclockwise the levels 39 parallel to the X—X axis will remain level, but the levels at right angles to the X—X axis will have their ends furthest removed from sector 41 lowered and their ends nearest sector 41 raised.

The mechanism for applying the corrective torques will now be described. At the top of standards 33 and insulated therefrom by suitable insulation members are carried five vertically spaced slip rings, 116, 117, 118, 119 and 120, electrically insulated from each other. The upper slip ring carries the movable members of push buttons 121, 122, 123 and 124 and is connected through a brush to conductor 125 which connects through conductor 64 to one side of the supply 61. The fixed member of push-button 123 is carried by slip ring 116, which is connected through a brush and conductor 126 to one end of a magnet coil 127 carried on a member 128 projecting upward from outer ring 7 in the vicinity of one of the bearings into which fits one of the trunnions 6. The other end of magnet coil 127 is connected through conductor 129 to the other side of the supply.

The fixed member of push-button 121 is carried by slip ring 118. This ring is connected through a brush and conductor 130 to one end of a magnet coil 131 carried by a member 128' projecting upward from outer gimbal ring 7 in the vicinity of the bearing which adjoins member 127. The other end of the magnet coil 131 is connected through conductor 129 to the other side of the supply. A magnetizable member 127' carried by inner ring 9, normally is centered between the magnets and is attracted to one or the other of them to apply a torque to the gimbal system as one or the other of the push-buttons 121, 123, closes the circuit of its magnet. By the energization of these magnets the gyroscope may be precessed in either a clockwise or counterclockwise direction about the Y—Y axis.

The fixed member of push-button 122 is carried by slip ring 119, which is connected through a brush and conductor 132 to one end of a magnet coil 133 supported below the normal X—X axis on bent rod 134 forming part of gimbal member 51. The other end of the magnet 133 is connected through conductors 135 and 129 to the negative side of the supply. The fixed member of push-button 124 is carried by slip ring 117. This ring is connected through a brush and conductor 136 to one end of a magnet coil 137, also carried by bent rod 134 but supported above the normal X—X axis. The other end of magnet coil 137 is connected through conductors 135 and 129 to the other side of the supply. A magnetizable member 138 carried by the gyroscope 11 and normally in line with the X—X axis is centered between the magnets 133 and 137 and is attracted to one or the other of them to apply a torque to the gyroscope as one or the other of push-buttons 122 and 124 closes the circuit of its magnet. By the energization of these magnets the gyroscope may be precessed in either a clockwise or a counterclockwise direction about the X—X axis. It will be noticed that the reaction of the torque applying magnets will not move the gimbal members upon which they are mounted as such members are locked against motion from this source, outer ring 7 being locked through worm wheel sector 115 and worm 114, and gimbal member 51 through worm wheel sector 76 and worm 75.

To prevent the gyroscope 11 from straying beyond a fixed limit it is provided with a spindle 140 which coincides with the spinning axis of the gyroscope and passes through an enlarged hole 141 in the top of gimbal member 51. If the gyroscope strays beyond the fixed limit the spindle will come into contact with the sides of hole 141 whereby the gyroscope will be precessed in another direction. This is especially useful as it prevents the gyro-system from going far from the follow-up gimbals when the energization of the gyroscope is discontinued. Hole 141 must, however, be of such size to allow sufficient clearance for the movement of the gyroscope necessary to cause the operation of the follow-up system.

When crank 4 is manipulated to train the instrument bevel gear 110 carried by shaft 111, bevel gear 71 carried by shaft 72 will rotate since double bevel gear 109 and shaft 70 which carries the other of the bevel gears 71 do not revolve with turntable 1. Bevel gear 31 carried by shaft 30, and bevel gear 47 carried by shaft 46 will also rotate since double bevel gear 32 and shaft 48 which carries the other of the bevel gears 47 also do not rotate with turntable 12. The rotation of the gears mentioned does not however, carry the members of the main and auxiliary gimbal systems out of their normal positions relative to the gyroscope 11. For the rotation of shaft 72 will through gears 73, shaft 74, worm 75, worm gear sector 76, rod 77, gimbal member 78, slot 79, rod 82, gimbal member 51 and rod 52 cause the commutator 53 to move to carry one of its contact members into contact with roller 62 thereby closing the circuit of motor 57. The rotation of motor 57 will through gears 65, shaft 66, gears 67, shaft 68, gears 69, shaft 70 and gears 71 cause shaft 72 to rotate in the opposite direction to carry gimbal member 51 back to the normal position. Since the action of motor 57 is very rapid the net effect of the training of the turntables is that shaft 72 will just turn enough to close the circuit of motor 57 through commutator 53 and roller 62, the motor 57 will thereafter rotate shaft 70 in the proper direction to keep shaft 72 from turning. The effect of the rotation of gear 110 is taken care of in a similar manner by motor 93. The rotation of bevel gear 31 and bevel gear 47 carried by shaft 46 will also be taken care of, as is obvious, by the rotation of motors 57 and 93.

The various conductors which connect the supply line, the servo-motors, etc., to elements which are movable with turntable 1 are shown to include slip rings and brushes as indicated at 142, but have not been described in detail as it is obvious that such brushes and slip rings must be provided to render the training of turntable 1 possible.

The various functions, adjustments, etc., of the apparatus disclosed have been described progressively for purposes of clarity but it is apparent that they may and usually do occur simultaneously.

While for purposes of illustration an embodiment of the invention has been disclosed in which the disc 39 that is controlled by the gyroscope carries spirit levels for indicating the straying of the gyroscope, it will be understood that the invention may be embodied in other forms in which a member corresponding to the disc may be controlled from the gyroscope for the purpose of serving as a support for any device requiring stabilization, such as a searchlight, a range finder, a sighting device or even a gun.

While the auxiliary gimbal system B is shown as mechanically connected to the main gimbal system A, it will be understood that any suitable electrical transmission system may be substituted for the mechanical connections shown.

While reversible motors controlled from the follow-up contacts of the gyroscope have been shown, it will be understood that any other suitable devices, such as clutches or the like, may be employed.

In general it will be understood that in addition to the possible embodiments specified above various changes in structural details may be made without departing from the principle of the invention as defined in the appended claims.

I claim:

1. In a gyroscopic system, the combination of a gyroscope adapted to assume a desired position, rotatably mounted supporting means therefor angularly displaceable as a whole about an axis of rotation, a gyroscope position indicating device, rotatably mounted supporting means therefor angularly displaceable as a whole about another axis of rotation, said gyroscope having freedom of movement about a plurality of other axes, said indicating device having freedom of movement about a like plurality of other axes, means operatively connected for rotating said rotatably mounted supporting means in unison about their respective axes of rotation to thereby maintain like axes of movement of the gyroscope and indicating device parallel, actuating means effective on said indicating device and its supporting means to move said indicating device about said plurality of axes of movement, means operated by relative motion between said gyroscope and supporting means for controlling said actuating means, and means at the gyroscope and controlled at the indicating device, effective to precess the gyroscope about any or all of said plurality of axes of movement back to the desired position as required by the deviations therefrom indicated at the indicating device.

2. In a gyroscopic system, the combination of a basic support adapted to tilt in various directions, outer and inner gimbal rings pivotally connected to each other and the outer ring being pivoted on said basic support on a single axis, a gyroscope pivoted on the inner gimbal ring on a normally horizontal axis perpendicular to the first mentioned axis and adapted to maintain a desired position, a member pivotally mounted on the outer gimbal ring on an axis thereof that is movable into and out of coincidence with the second mentioned axis, a gyroscope position indicating device remotely located relative to said gyroscope, supporting means therefor, means for actuating said supporting means and indicating device in accordance with straying of the gyroscope about the first and second mentioned axes including control devices one of which is governed by relative pivotal movement between said outer and inner gimbal rings and another thereof being governed by relative pivotal movement between said gyroscope and member, and means to apply torque to said gyroscope about said first and second mentioned axes, said means extending to and being controllable at said indicating device to be effective to precess said gyroscope back to the desired position in accordance with the indications of said indicating device.

3. In a gyroscopic system, the combination of a rotatable base, a gyroscope having a casing and adapted to maintain its spinning axis in a desired angular position, supporting means for the gyroscope mounted on said base and rotatable therewith and with said casing about an axis, said means permitting said gyroscope to stray freely, a gyroscope position indicating device remotely located relative to said gyroscope, a second rotatable base, supporting means for the device mounted on said second base and rotatable therewith and with said device about an axis bearing a predetermined relation to the first mentioned axis, an operating connection between the bases of the first and second mentioned supporting means operable to simultaneously and synchronously turn both of said supporting means about said axes, means controlled by said gyroscope and its supporting means as the gyroscope strays effective to move said indicating device in accordance with the straying of said gyroscope from its desired position, and means having individual controls operable at said indicating device and extending to said gyroscope, said last mentioned means being provided thereat with torque-applying means responsive to said individual controls to be effective to precess said gyroscope back to the desired position in accordance with the indications of said indicating device.

4. In a gyroscopic system, the combination of a gyroscope supporting means angularly displaceable about three axes, a gyroscope mounted on said means to assume a desired position from which it can stray about two of said axes, a gyroscope position indicating device remotely located relative to said gyroscope, supporting means therefor angularly displaceable about three similar axes, means for correspondingly angularly adjusting both of said supporting means each about one of its axes corresponding to the similar axis of the other, means controllable at said gyroscope and its supporting means in response to straying of the gyroscope, said means extending to and being effective to move said second supporting means and said indicating device about two axes to duplicate the straying movements of said gyroscope, and means controllable at said indicating device and its supporting means extending to and effective to precess said gyroscope back to the desired position in accordance with the indications of said indicating device.

5. In a gyroscopic system, the combination of a base pivoted to turn about an axis, a gyroscope adapted to maintain a desired position, a universally movable supporting means therefor mounted on said base, a gyroscope position indicating device remotely located relative to said gyroscope, a universally movable supporting means therefor mounted upon another base pivoted to turn about another axis parallel to the first mentioned axis, separate gear trains mounted on said last mentioned pivoted base for angular displacement therewith and actuatingly connected respectively to the second mentioned supporting means and said indicating device, means controllable at and by said gyroscope and its supporting means effective to actuate said gear trains to move said second supporting means and said indicating device in accordance with the movements of the gyroscope relatively to its base, whereby said indicating device and its supporting means duplicate the movements of said gyroscope relatively to its supporting means, means for synchronously turning both of said supporting means and their bases in unison about their respective parallel axes, and means controllable at said indicating device and its supporting means extending to and effective to precess said gyroscope back to its desired position in accordance with deviations indicated by said indicating device.

6. In a gyroscopic system, the combination of a gyroscope, a basic support rotatable about an axis, gimbal rings one pivotally mounted on said basic support on an axis perpendicular to the axis of rotation of said support and another pivotally mounted on the first specified gimbal ring on the same axis, a pair of members one pivotally mounted on the first specified gimbal ring on an axis perpendicular to its pivotal axis, the other of said members being pivotally mounted on said basic support on an axis also perpendicular to the pivotal axis of the first specified gimbal ring, said members having a connection whereby the first identified member may be angularly displaceable by the other member, said members also being relatively angularly displaceable about said pivotal axis of the first specified gimbal ring, said gimbal rings supporting said gyroscope for movement about mutually perpendicular axes, an indicating device remotely located relative to said gyroscope, a universal support therefor, a second basic support rotatable about another axis and carrying said universal support, means controlled by said gyroscope, gimbal rings and members effective to move said universal support and indicating device in accordance with the movement of said gimbal rings and gyroscope to cause said indicating device to duplicate the movement of said gyroscope, and a single means for synchronously rotating both of said basic supports about their respective axes of rotation.

7. In a gyroscopic system, the combination of a gyroscope adapted to assume a desired position, a gimbal system supporting the gyroscope with freedom to stray about a plurality of axes, control devices governed by said system and gyroscope, energizable means under the control of said devices for displacing the gimbal system about said axes to maintain it in a predetermined relation to the gyroscope, an auxiliary gimbal system, means actuated by the first named means for maintaining the auxiliary system in a predetermined relation to the first system, means operable by the auxiliary system for indicating departure of the spinning axis of the gyroscope from a normal position, and means adjacent the auxiliary system and operable upon the gyroscope to apply torques thereto to precess the same back to the desired position after deviations therefrom.

8. In a gyroscopic system, the combination of a gyroscope, supporting means therefor comprising a plurality of gimbal rings pivotally connected to each other on an axis and the outer ring being pivotally supported about the same axis, said gyroscope being pivotally mounted on the inner one of said gimbal rings on an axis perpendicular to the first named axis whereby it may stray about both of said axes, a frame having a bail-like portion, said frame being pivotally mounted on another of said gimbal rings on the second named axis, an indicating device remotely located relative to said gyroscope, means for supporting said indicating device for movement about axes bearing a predetermined relation to the axes about which the gyroscope may stray, means controlled by relative angular movements between said gyroscope, frame and gimbal rings as said gyroscope strays effective on said indicating device and its supporting means to move said indicating device and its supporting means in accordance with said relative angular movements, and means operated by said controlled means to move said bail and gimbal rings relatively to said gyroscope to deenergize said controlled means.

9. In a gyroscopic system, the combination of a gyroscope, supporting means therefor rotatable about an axis and including a plurality of pivoted gimbal rings mounting said gyroscope for universal movement about mutually perpendicular axes, a frame having a bail-like portion said frame being pivotally mounted on an axis on one of said gimbal rings for displacement therewith as said ring pivots, said axis being movable into and out of coincidence with one of said axes about which said gyroscope is movable, an indicating device remotely located relative to said gyroscope, supporting means for said device rotatable about an axis parallel to the first named axis, means controlled by relative pivotal movement between said gyroscope, gimbal rings and frame effective on said indicating device and its supporting means to move said indicating device to follow the movement of said gyroscope relatively to its supporting means, and means for synchronously rotating both of said supporting means about their respective axes in unison.

10. In a gyroscopic system, the combination of a basic support adapted to tilt in various directions, outer and inner gimbal rings pivoted to each other on a single axis, means for pivotally supporting said outer ring on said basic support on the same axis, a gyroscope pivotally mounted on the inner gimbal ring on a normally horizontal axis perpendicular to the first mentioned axis, said gyroscope being thus mounted to stray about each of said axes, a member pivotally mounted on the outer gimbal ring on an axis thereof that is movable into and out of coincidence with the second mentioned axis, an indicating device, supporting means therefor having freedom of movement about axes parallel to said axes about which said gyroscope may stray, actuating means for displacing said indicating device and its supporting means about said parallel axes, and means under the control of said gyroscope, gimbal rings and member operable only in proportion to the straying of the gyroscope from normally vertical position to control said actuating means to operate said indicating device said outer ring and member only in correspondence with the straying of said gyroscope.

11. In a gyroscopic system, the combination of two pairs of basic pivotal supports in fixed relation to each other and forming mutually perpendicular normally horizontal axes, a gyroscope, supporting means therefor comprising gimbal rings, one ring being pivotally mounted on one of the said axes and another of said gimbal rings being pivotally mounted upon the first mentioned gimbal ring on the same axis, said gimbal rings mounting said gyroscope for movement about the second of said mutually perpendicular axes, a pair of connected members one being a bail pivotally mounted upon the remaining axis, the other member being pivotally mounted on the first specified gimbal ring to pivot about an axis normal to said first one axis, an indicating device remotely located relative to said gyroscope, supporting means therefor and means controlled by angular movement of said gyroscope relatively to said gimbal rings to move said second named supporting means and said indicating device in accordance with the movements of said gimbal rings and gyroscope about said mutually perpendicular axes.

ELLIOTT P. ROSS.